United States Patent [19]

Lakes

[11] Patent Number: 4,546,134
[45] Date of Patent: Oct. 8, 1985

[54] COATED, HEAT SHRINKABLE EXPANDED POLYSTYRENE

[75] Inventor: Sherman Lakes, Lexington, Ky.

[73] Assignee: Day Star Concepts, Lexington, Ky.

[21] Appl. No.: 479,018

[22] Filed: Mar. 25, 1983

[51] Int. Cl.⁴ ............................................. C08K 5/52
[52] U.S. Cl. .................................. 524/141; 524/414; 524/417
[58] Field of Search ............... 524/125, 414, 127, 417, 524/141

[56] References Cited

U.S. PATENT DOCUMENTS

| | | | |
|---|---|---|---|
| 3,059,987 | 10/1962 | Baumann | 8/4 |
| 3,131,088 | 4/1964 | Festag | 117/161 |
| 3,298,990 | 1/1967 | Cousens et al. | 260/30.4 |
| 3,337,390 | 8/1967 | Saunders | 161/160 |
| 3,361,702 | 1/1968 | Wartman et al. | 524/377 |
| 3,399,025 | 8/1968 | Nicholson | 8/4 |
| 3,431,319 | 3/1969 | Baum | 260/861 |
| 3,661,610 | 5/1972 | Ferris | 106/306 |
| 3,669,728 | 6/1972 | Seiner | 117/161 UA |
| 3,669,729 | 6/1972 | Seiner | 117/161 UA |
| 3,705,124 | 12/1972 | Selby et al. | 524/127 |
| 4,128,695 | 12/1978 | Kikuchi et al. | 428/423 |
| 4,233,081 | 11/1980 | Plumet | 106/214 |

FOREIGN PATENT DOCUMENTS 1295186 5/1969 Fed. Rep. of Germany .

Primary Examiner—Paul Lieberman
Assistant Examiner—Amelia B. Yarbrough
Attorney, Agent, or Firm—Wood, Herron & Evans

[57] ABSTRACT

A composition and method for color coating an expanded polystyrene "drop-out" ceiling tile, by which its heat shrinking drop-out characteristic is preserved. The composition comprises a water soluble salt of a polymer of acrylic acid as a film forming component, a plasticizing component, a pigment component and a pigment dispersing component such as clay. The ceiling drop-out and surface flame properties of the polyacrylate coated expanded polystyrene substrate compare favorably with those of uncoated expanded polystyrene used for the same purpose.

5 Claims, No Drawings 4,546,134

COATED, HEAT SHRINKABLE EXPANDED POLYSTYRENE

BACKGROUND OF THE INVENTION

1. Field of the Invention

The present invention relates to a color coated expanded polystyrene substrate.

More particularly, the present invention relates to a coating composition for use in producing such a polystyrene substrate.

Still more particularly, the present invention relates to a coating composition and a method of color coating an expanded polystyrene drop-out ceiling tile, by which its heat shrinking drop-out characteristic is preserved.

2. Description of the Prior Art

Suspended ceilings of translucent or opaque plastic panels are regularly installed in commercial buildings to conceal ducts, wiring, piping, lighting fixtures and the like, as well as for decorative purposes. Such a plastic ceiling panel or tile must conform to certain fire standards. If the ceiling tile conceals a heat activated sprinkler system, it must quickly react to heat by "shrinking" so as to "drop out" of its setting in the event of fire, thereby exposing the automatic sprinkler system located above the suspended ceiling. Such a panel, moreover, should not be flammable in the event of fire, and it should not contribute fuel nor generate smoke.

Uncoated expanded polystyrene board stock prepared by foaming polystyrene beads in a conventional manner has been found to possess these various properties and has, accordingly, received the approval of the Factory Mutual System as meeting its standards for use in suspended ceilings where fire sprinkler systems are employed (Factory Mutual Approval Guide Supplement II 1982, page 32, "Suspended Ceilings Plastic"). Expanded polystyrene ceiling panels, therefore, are widely accepted and used particularly in commercial buildings where product conformity with Factory Mutual System standards is essential. The natural color of expanded polystyrene board stock, however, is opaque white, which renders ceiling panels made from such stock unusable, or at least undesirable, for installations where a colored ceiling is required or desired. Unfortunately, it is very difficult, because of the cellular wall structure of expanded polystyrene, to coat it without significantly etching and damaging its surface. This difficulty, moreover, is aggravated in the instance of ceiling tiles or panels since the coating must not only not damage the surface of the panel, but must also not harm the drop-out or heat shrink properties of the expanded polystyrene which make it acceptable for suspended ceiling installation. The coating must not insulate the polystyrene; an insulating affect would detrimentally affect its heat shrink capability. Similarly, if the coating strengthens or reinforces the ceiling tile, the heat shrink characteristics will also be adversely affected.

Attempts have been made to paint or otherwise color coat expanded polystyrene drop-out ceiling tiles, but without success, principally because the drop-out characteristic of the uncoated polystyrene is altered beyond acceptable standards. These color coating attempts, moreover, have entailed procedural requirements of such cost, especially when applied to surfaces of large areas, as to make them prohibitive as a practical matter even if they were technically successful.

DESCRIPTION OF THE PREFERRED EMBODIMENT

Expanded polystyrene used for manufacturing suspended ceiling panels usually has a density of about 1 lb./cu.ft. The temperature at which an expanded polystyrene ceiling panel or tile drops out, or melts out, of its suspension mounting on the ceiling during a fire is directly related to the density of the expanded polystyrene. Accordingly, any coating applied to the surface of polystyrene must not so alter its density or strength as to adversely affect its heat-shrink capability. The coating, moreover, must have minimal, or no, insulating capacity which might delay transfer of heat to the polystyrene so as to affect this heat-shrink capability. As the expanded polystyrene panel shrinks under the impact of heat, the panel coating must likewise shrink, without impeding the polystyrene shrink rate. In the event of fire, the coated panel should exhibit no greater tendency to flame (burn) than does similar but uncoated panel, and should contribute little in the way of fuel or smoke generation. Further, in the event of fire, there should be no separation, loss or drop out of any component of the coating, apart from the drop out of the expanded polystyrene itself.

While the patent art is replete with compositions and procedures for applying various types of coatings to various types of substrates, including substrates of expanded polystyrene in various forms, none of these address the problem of color coating expanded polystyrene board stock intended for use as suspended drop-out ceiling paneling. As representative of this patent art, U.S. Pat. No. 3,337,390, for instance, discloses the bonding of a protective coating to the surfaces of expanded polystyrene articles in the form of buoyant and thermally insulated items, including building panels, by applying thereto a settable mixture of a polyester resin and a vinyl monomer together with a catalyst to promote polymerization. A good bond of a tough, impervious coating is said to be obtained without first preparing the surface of the polystyrene substrate.

U.S. Pat. No. 3,131,008 relates to the preparation of coated webs which are suitable for application to various carriers to improve their surface characteristics. The process of that patent comprises the application of an aqueous dispersion of a partially polymerized allyl phthalate, prepared from an aqueous emulsion of the latter containing a polyacrylic acid as an emulsifier, to a web such as paper. The resultant dried web is then used as a decorative material for a carrier such as fiber board to which it is bonded by means of heat and pressure.

U.S. Pat. No. 3,661,610 relates to the preparation of a pre-dispersed mixed pigment comprising a clay pigment component and a calcium carbonate pigment component. More specifically, an aqueous dispersion of a clay pigment containing a water soluble condensed phosphate as a first dispersing agent and a water soluble salt comprising a macromolecular anion, such as sodium polyacrylate, as a second dispersing agent is mixed with an aqueous dispersion of calcium carbonate also containing a quantity of the second dispersing agent, and the mixture dried. The dried, pre-dispersed mixed pigment can then be re-dispersed in water, for instance to coat paper and the like.

U.S. Pat. No. 4,128,695 relates to a process for coating a substrate, such as expanded polystyrene, with a coating mixture comprising a hydrophobic synthetic resin, such as a vinyl acetate, and a hydrophylic polymer, such as polysodium acrylate. The coating mixture also includes a finely divided inorganic filler, such as clay, for providing uniform deposition of paint subsequently applied to the coated substrate, and a polyisocyanate which serves to enhance the adhesive strength between the coating and the substrate. A coating having excellent ink acceptability is said to be obtained.

U.S. Pat. No. 4,233,081 discloses a process for forming aqueous dispersions of various organic and inorganic filler materials, such as various polymers, clay, calcium carbonate, etc., which can be used for various purposes including the formation of coating compositions. In essence, that process comprises forming an aqueous dispersion of a filler material using an alkali metal salt of an alpha-hydroxyacrylic acid, such as sodium poly-alpha-hydroxyacrylate, as a dispersing agent. When the resultant dispersion is used to prepare a coating composition, such as a paper coating composition or a water based paint, the composition may contain such other appropriate additives as pigments, binders, plasticizers, etc. as the particular usage may dictate.

U.S. Pat. No. 3,431,319 relates to a method of coating expanded polystyrene articles with a mixture comprising as a major component an unsaturated polyester, such as an alkyl vinyl ether, and as a minor component a monovinyl ether such as 2-ethylhexyl vinyl ether. If desired, the mixture may be diluted with a small amount of styrene and may also contain fillers such as clay, as well as pigments or dyes depending upon the coating characteristics desired. The patent states that coatings may be provided which are glossy and/or which may render the polystyrene surface flame, mar and chemical resistant, all without significant attack on the surface of the substrate.

Notwithstanding that some of these patents may individually disclose one or more of the components of the composition of the present invention as subsequently described herein, nevertheless, none of them in any addresses the specific standards that must be met by color coated expanded polystyrene drop-out ceiling panels, nor can any of the compositions or processes of the prior art be adapted to produce polystyrene ceiling panels meeting these specific standards. Accordingly, since attempts practiced in the field for color coating polystyrene ceiling panels have been failures, there currently exists no color coated ceiling panel which carries the approval of the Factory Mutual System (Factory Mutual Approval Guide Supplement II 1982, page 32, "Suspended Ceilings, Plastic").

SUMMARY OF THE INVENTION

There has continued to remain, therefore, a need for a color coated polystyrene substrate acceptable for use as panels in suspended drop-out ceilings. It is a principal object of this invention to fulfill this need. It is a further object of this invention to provide a composition for coloring the surface of an expanded polystyrene substrate. It is still a further object of this invention to provide a method of color coating an expanded polystyrene substrate using the composition of this invention. Another object of this invention is to provide a color coated expanded polystyrene ceiling panel whose properties are essentially the same as those of an uncoated polystyrene ceiling panel. Still another object of this invention is to provide a color coated expanded polystyrene ceiling panel whose drop-out and flammability properties are essentially unchanged from those of a similar but uncoated polystyrene ceiling panel. It is also an object of this invention to provide a color coated ceiling panel of expanded polystyrene whose fuel contribution and smoke generation properties in case of fire are essentially no greater than those of an uncoated panel.

These various objects have been met in accordance with this invention by a coating composition for an expanded polystyrene substrate comprising a film forming component, a plasticizer component, a pigment component and a pigment dispersing component. More specifically, the composition of this invention comprises a water soluble salt of a polymer of acrylic acid as the film forming component; plasticizing component; a pigment component of selected color; and an inorganic dispersing component such as clay. The several components of the composition are brought together into a sprayable or brushable aqueous dispersion, and are applied to the surface of an expanded polystyrene substrate by conventional means. The coating is cured by drying to give a color coated expanded polystyrene substrate. When the coated polystyrene substrate is used to prepare a panel for use in a suspended ceiling and subjected to testing, the panel is found to comply with drop-out and flammability standards currently established for such panels.

The coating composition of this invention comprises, as its principal active component, a film forming component which is a water soluble salt of a polymer of acrylic acid, e.g., an alkali metal polyacrylate. This component serves to provide the film coating by which the pigment employed to impart the desired color to the surface of the polystyrene substrate is bound thereto.

The preferred polyacrylate is a water soluble sodium polyacrylate. Although potassium and ammonium polyacrylates are available, they are less preferred due to cost and odor.

The concentration of the polyacrylate is important. If the polyacrylate concentration is too low, the coated article will not exhibit adequate color fastness, i.e., the color pigment can be washed or wiped off. On the other hand, it has been found that if too high a proportion of polyacrylate is present, the coating will decrease the heat shrinkability (rate) of the coated expanded polystyrene panel. Thus, when used in amounts in which the active polyacrylate concentration is less than about 35% of the total of the actives or solids of film former, dispersing agent and plasticizer, it has been found that the resulting cured coating begins to lose its color fastness; and, on the other hand, when the polyacrylate concentration exceeds about 55% of the total actives in the film former, dispersing agent and plasticizer, the drop-out property of the polystyrene substrate is adversely affected.

It has been further found that increasingly greater polyacrylate concentrations tend to increase the flammability of the coated substrate until a point is reached at which the substrate can be totally consumed in a vertical burn test, to be hereinafter described. For purposes of this invention, therefore, it has been determined that in order to provide an expanded polystyrene ceiling panel with the required drop-out and flammability properties, the coating composition should have an active film forming polyacrylate content ranging from about 35% to about 55% by weight of the total actives in the film former, dispersing agent, and plasticizer combined.

In applying a color coating to an expanded polystyrene substrate in accordance with this invention, it has been found necessary to modify the surface of the polystyrene by "etching" it in order to effect a strong bond between the substrate surface and the polyacrylate film. Accordingly, the composition of this invention also includes a plasticizing component which is a resin plasticizer, such as a phosphate-type plasticizer. Since certain plasticizers act as flame retardants, it is desirable to employ one of these which imparts to the polyacrylate film an improved flame retardation capability. For the purposes of this invention, therefore, it is preferable to use a flame retarding phosphate-type plasticizer.

There are many different compounds which can be used as plasticizers, but which are not flame retardants. For example, benzene and benzene derivatives, such as Benzoflex 9-88 TM, produced by Velsicol Chemicals, and phthalate-type plasticizers, such as Sanitizer 160 produced by Monsanto, function as plasticizers. These are less desirable because they do not act as a flame retardant. They also tend to burn. Therefore, when these plasticizers are used, a flame retardant, such as triphenyl phosphate, is required. Flame retardants, in addition to increasing cost, tend to create smoke which is undesirable.

Accordingly, plasticizers which are themselves the flame retardant are preferred. One preferred type of plasticizer is a phosphate plasticizer such as alkyl aryl phosphate. The preferred plasticizer is 2-ethylhexyl diphenyl phosphate. This plasticizer is also preferred because it provides a cold block. In other words, when this plasticizer is used in a coating, the cured coating resists cracking caused by low temperatures. Triphenyl phosphate is also a good plasticizer.

The weight percentage of plasticizer is significant. If insufficient plasticizer is present, the polyacrylate will not adhere strongly to the polystyrene. If excess plasticizer is used, the surface of the polystyrene will be so pitted that the surface will be aesthetically unappealing.

When the plasticizer is used in amounts less than about 15% by weight actives based on the combined actives of the film former plasticizer and dispersant, it has been found that the resulting bond between the surface of the substrate and the polyacrylate film begins to become less effective, particularly at those points where the interior cell walls may have been exposed as a result of the substrate having been cut. At contents greater than about 40% by weight actives, an undesirable softening of the polystyrene surface occurs, which permits penetration by the polyacrylate coating composition, aesthetically damaging the polystyrene surface. In order to obtain the best coating results, therefore, it is preferable in accordance with this invention to restrict the plasticizer content of the coating composition to a range of from about 15% to about 40% by weight of the total of the film former, plasticizer and dispersing agent.

Although the polyacrylate film forming component of the composition has some inherent dispersing capability of its own, its proportion in the composition is insufficient to provide acceptable dispersion of the pigment. Accordingly, a dispersing agent is introduced into the composition.

There are many different agents which will disperse the pigment. These include colloidal clay, hydrated alumina, talc, silica clay and chalk. Talc and chalk are less preferred because they cause the dried film to be too sensitive to water. Hydrated alumina is less preferred because it causes the formation of white data on the surface of the coated ceiling tile. Colloidal silica clay is by far the preferred dispersant, particularly when an alkyl aryl phosphate plasticizer is used. The other dispersants tend to separate or fall out when subjected to flame.

Colloidal silica clay is also preferred because it binds the phosphate-type plasticizer. When non-phosphate plasticizers are used with this colloidal clay, the plasticizer will separate from the cured coating when heated. When separated from the coating, it is more likely to flame. However, when colloidal silica clay is used with a phosphate plasticizer, the clay binds the plasticizer and prevents the plasticizer from separating. This improves the coating in general, and particularly improves its flame retardance.

The concentration of the dispersant relative to the combined actives of the film former dispersing agent and plasticizer must be sufficient to effectively disperse the pigment, but not be so high that the dispersant is easily rubbed off.

At amounts less than about 20% by weight, an unacceptable dispersion of the pigment is obtained, resulting in gathering or drifting together of the pigment particles on the surface of the polystyrene substrate when the coating composition is applied thereto. In amounts greater than about 45% by weight, the resultant coating takes on a powder-like appearance and is subject to errosion, particularly by air movement when the coated substrate is placed as a panel in a suspended ceiling.

The coating composition of this invention is employed in the form of an aqueous dispersion, the water serving as a carrier for the various components. Except to the extent that the water content should neither be so great as to result in a pigmented coating whose wash resistance is inadequate, nor so little as to result in a coating whose thickness is so great as to adversely affect the drop-out and other burn properties of the coated polystyrene substrate, the water content of the composition is not critical. Generally, coating composition as applied will contain from about 85% to about 97% water by weight, and preferably about 95% water.

So far as the pigment employed in the composition is concerned, any pigment, preferably in the form of an aqueous dispersion of which a wide selection is commercially available, can be incorporated therein to impart to the coated polystyrene substrate the desired color.

The various components of the aqueous coating composition are brought together and mixed in conventional manner using agitation at ambient temperatures. The resultant polyacrylate coating composition exhibits exceptional freeze-thaw qualities, while a coating prepared therefrom has a high resistance to cracking and crazing when exposed to freezing temperature conditions. Accordingly, both the coating composition and the coated polystyrene can be exposed to low temperatures in storage or on outside job sites without fear of damage to either.

The polyacrylate coating composition can be applied to the polystyrene substrate either in a plant facility or on a job site using conventional spraying or brushing or other coating application means. Since the aqueous coating composition is alkaline, having a pH of about 10-11, it has no adverse effect on the polystyrene surface. In application, the coating composition is used in a quantity range of about 2 wet grams to about 7 wet grams per square foot of expanded polystyrene surface to be coated, an application range found to produce a coating of the desired properties. Both the application of the composition and the curing (by air drying) of the coating can be conducted at ambient temperatures.

The following examples further illustrate the coating composition and method of this invention. Unless otherwise noted, all parts are by weight.

EXAMPLE 1

A coating composition according to the present invention was prepared by bringing together and mixing by mechanical agitation: (1) a film former comprising 43 parts of MODICOL VD containing 15%, or 6.45 parts solids (a sodium polyacrylate product of Diamond Shamrock having specific gravity of 1.03 and density of 8.5 lbs. per gallon); (2) a plasticizer comprising 7.5 parts of SANTICIZER 141 (2-ethylhexyl thyldiphenyl phosphate flame retardant plasticizer made by Monsanto Chemical Company and having 56–59% active material); (3) a dispersing agent comprising 5 parts of colloqual clay ATEGEL 50 (a colloidal silica clay product of Englehardt Company); and (4) 406.5 parts of water. In this composition, the weight percentages of the active solids, and excluding the water, were film former 41%, plasticizer 32%, and dispersing agent 28%.

EXAMPLE 2

To the coating composition of Example 1 was added as aqueous dispersions and with agitation 10 parts of No. 308 White, 5 parts of No. 3041 Red Oxide, and 15 parts of No. 617 Chromium Green Oxide (pigments of Harshaw Chemical Company) to form a pigmented coating composition.

EXAMPLE 3

To demonstrate the wash resistant property of a coating prepared from the pigmented coating composition of Example 2, a 1'×1'×½" panel of expanded polystyrene of 1 lb./cu.ft. density was brushed with 7 wet grams per square foot of the pigmented coating composition of Example 2. After application was completed, the coated panel was dried and cured for 24 hours at room temperature. The coated panel was then submerged in water for 5 hours, after which it was withdrawn and dried. A color comparison was then made against a control panel coated with the same composition in the same manner but not subjected to water submersion. Only minute traces of color fading were evident in the test panel.

EXAMPLE 4

The procedure of Example 3 was repeated using a 2'×2'×½" test panel. The composition of Example 2 was applied at a rate of 6 wet grams per square foot of panel. The dried coated panel was then placed in a grid system simulating a suspension ceiling. The back of the panel was then subjected to a steady drip of water. The weight of the water dished the panel, but did not push it out of the grid. Overflowing water continuously ran down the curved surface of the coated side during the test. After 72 hours, the panel was removed from the grid and dried. Visual inspection of color distortion or wash as against a control panel indicated that none had occurred.

EXAMPLE 5

The composition of Example 2 was applied to a test panel of expanded polystyrene of 2'×2'×1¼" having a ⅝" rabbeted edge. The composition was applied by spraying at a wet rate of 5.9 grams per square foot. The dried panel was placed in a typical ceiling suspension frame to form one half of the ceiling of a test enclosure. The remaining half of the enclosure consisted of ½" thick non-flammable board. The enclosure was then raised 12" above the floor and a radiant heat source placed centrally under the non-flammable board so that the blanketing heat would rise to the coated surface of the test panel. The radiant heat source was then ignited. In order for the coated panel to be deemed to have an acceptable drop-out property in accordance with this test, the panel must drop out at a temperature at least 300° F. below the 850° F. ignition temperature of an uncoated polystyrene panel, that is, it must drop out below 550° F. The coated test panel distorted and dropped out of its frame prior to reaching a temperature of 540° F.

EXAMPLE 6

The procedure of Example 5 was repeated five times with panels coated as above described and five times with uncoated expanded polystyrene panels. All test panels dropped out prior to reaching a temperature of 540° F. There was no time or temperature differential between the coated and uncoated panels.

EXAMPLE 7

In order to test the surface flammability of a coated panel prepared using the composition of this invention, an expanded polystyrene panel as in Example 5 and coated as in Example 5, together with an uncoated expanded polystyrene panel as a control were held vertically, ½" apart and a lighted propane torch placed between the panels at their bases and held for a 15 second period. When the flame was removed and the panels inspected, no burning of either the coated or the uncoated panel was observed.

EXAMPLE 8

The procedure of Example 7 was repeated five times. No burning of either the coated or uncoated panels was observed.

The following examples demonstrate the effect of changing the relative proportion of the components of the coating composition. In each of these examples, the film forming component is Modicol VD TM which is 15% solids, the plasticizer is Sanitizer 141 TM which includes 56% to 59% actives, and the dispersant is Ategel 50 TM colloqual clay.

EXAMPLE 9

A coating composition comprising 38 parts by weight Modicol VD TM, 7.5 parts by weight Sanitizer 141 TM, and 5 parts by weight Ategel 50 TM, and pigment was mixed with 411.5 parts by weight of water and coated onto an expanded polystyrene substrate (5.6–5.9 wet grams per square foot) after drying the color in the coating streaked when the panel was rinsed with water.

EXAMPLE 10

A coating composition comprising 60 parts by weight Modicol VD TM, 7.5 parts by weight Sanitizer 141 TM, and 5 parts by weight Ategel 50 TM was mixed with 389.5 parts water. Approximately 5.6–5.9 wet grams of this formulation was applied per square foot of an expanded polystyrene substrate and dried. The coated substrate burned in a vertical position.

EXAMPLE 11

A coating composition including 50 parts by weight of Modicol VD ™, 11 parts by weight of Sanitizer 141 ™, and 5 parts by weight of Ategel 50 ™ was mixed with about 396 parts by weight of water. Approximately 5.6–5.9 wet grams of this coating composition was applied per square foot of an expanded polystyrene substrate and dried. The increased amount of plasticizer resulted in pitting of the polystyrene surface.

EXAMPLE 12

A coating composition including 50 parts by weight sodium polyacrylate Modicol VD ™, 7.5 parts by weight plasticizer Sanitizer 141 ™, and 10 parts by weight of Ategel 50 ™ was mixed with 394.5 parts water. Approximately 5.6–5.9 wet grams of this coating composition was applied per square foot of an expanded polystyrene substrate and allowed to dry. The coating had a rough texture which eroded easily.

EXAMPLE 13

A coating composition including 43 parts by weight of Modicol VD ™, 7.5 parts by weight Sanitizer 141 ™, and 3 parts by weight Ategel 50 ™ was mixed with 408.5 parts by weight of water Approximately 5.6–5.9 wet grams of this composition was applied per square foot of an expanded polystyrene substrate and allowed to dry. Due to the low concentration of clay in this formulation, the pigment was not adequately distributed, and the plasticizer became slightly dominant.

The above examples, 1-13, demonstrate that an expanded polystyrene panel can be coated with a pigmented coating without adversely affecting the heat shrink characteristic of the expanded polystyrene panel. Using the method of the present invention, a drop-out ceiling file can be coated with a color coating which is not excessively sensitive to water, which provides a well dispersed color, which is not extremely sensitive to cold, and which does not pit the smooth surface of the expanded polystyrene. All of these advantages are obtained along with the major advantage that the heat shrink characteristic of expanded polystyrene is not adversely affected.

Therefore, having described my invention, I claim:

1. An aqueous composition for coating an expanded polystyrene substrate comprising
   a water soluble salt of a polymer of acrylic acid as a film forming component,
   a plasticizing component effective to plasticize polystyrene;
   a pigment;
   an inorganic dispersing agent for dispersing the pigment; and
   said film forming component present in an amount effective to bind said dispersing agent and said pigment to said substrate, said film forming component further being present in insufficient amounts to adversely affect the heat shrink characteristics of said expanded polystyrene substrate;
   wherein the relative weight percentages of the combination of said film forming component, said plasticizing component and said dispersing component comprises:
   from about 35% to about 55% film forming component, from about 15% to about 40% plasticizing component; and from about 20% to about 45% dispersing agent;
   said percentages based on the combined actives which are said film forming component, said plasticizing component and said dispersing agent.

2. An aqueous composition for coating an expanded polystyrene substrate as claimed in claim 1 wherein said film forming component is an alkali metal polyacrylate.

3. An aqueous composition for coating an expanded polystyrene substrate as claimed in claim 1 wherein said plasticizing component is a phosphate-type plasticizer.

4. An aqueous composition for coating an expanded polystyrene substrate as claimed in claim 1 wherein said dispersing agent is colloidal silica.

5. An aqueous composition for coating an expanded polystyrene substrate as claimed in claim 3 wherein said dispersing agent is colloidal silica.

* * * * *